(12) United States Patent
Ohmura

(10) Patent No.: US 6,378,240 B1
(45) Date of Patent: Apr. 30, 2002

(54) FISHING ROD AND LINE GUIDE THEREOF

(75) Inventor: Ryuichi Ohmura, Shizuoka (JP)

(73) Assignee: Fuji Kogyo Co., Ltd., Shizuoka (JP)

( * ) Notice: Subject to any disclaimer, the term of this patent is extended or adjusted under 35 U.S.C. 154(b) by 0 days.

(21) Appl. No.: 09/503,915

(22) Filed: Feb. 15, 2000

(30) Foreign Application Priority Data

Mar. 10, 1999 (JP) ........................................... 11-062492

(51) Int. Cl.[7] ............................................... A01K 87/04
(52) U.S. Cl. ........................................... 43/24; 43/18.1
(58) Field of Search ................................... 43/24, 18.1

(56) References Cited

U.S. PATENT DOCUMENTS

| | | | | |
|---|---|---|---|---|
| 387,545 A | * | 8/1888 | Comstock | 43/24 |
| 1,781,569 A | * | 11/1930 | Cook | 43/24 |
| 3,690,027 A | * | 9/1972 | Ohmura | 43/24 |
| 3,780,684 A | | 12/1973 | Ohmura | |
| 4,176,488 A | * | 12/1979 | Ohmura | 43/24 |
| 4,215,504 A | * | 8/1980 | Ohmura | 43/24 |
| 4,428,140 A | * | 1/1984 | Yamamoto | 43/24 |
| 4,507,891 A | * | 4/1985 | Ohmura | 43/24 |
| 5,870,848 A | * | 2/1999 | Ohmura | 43/24 |

FOREIGN PATENT DOCUMENTS

| | | | | |
|---|---|---|---|---|
| DE | 739601 | * | 8/1943 | 43/24 |
| DE | 2263230 | * | 7/1974 | 43/24 |
| GB | 1080514 | * | 8/1967 | 43/24 |
| JP | A-48-85377 | | 2/1947 | |
| JP | A-63-137630 | | 12/1961 | |

* cited by examiner

*Primary Examiner*—Kurt Rowan
(74) *Attorney, Agent, or Firm*—Oliff & Berridge, PLC

(57) ABSTRACT

For line guides having a frame that includes two rear support legs on its sides, if the inclination of for the rear supporting legs is reduced by lengthening the rear support legs, then the material costs and weight of the frame are increased. Thus, the invention provides a line guide, wherein the length of a rear support leg of a frame for intermediate guides is made longer than the length of a front support leg and a front mounting foot. The front support leg and the front mounting foot are cut and bent out from an area surrounded by the rear support legs. The height of the front support leg is limited to approximately one-fourth (¼) of the outer diameter of a ring holding part. Therefore, due to the low height, it is hard for the line to get tangled, and the accuracy of casting increases. The line is easily released simply by lengthening the rear support leg to reduce the inclination of the rear support legs. The increase in weight of the rear support legs can be canceled by the reduction in weight of the front support leg. In addition, the material cost does not increase, even if the rear support legs are made long since the front support leg and the front mounting foot can be formed using material from an area surrounded by the rear support legs, which is conventionally discarded.

19 Claims, 3 Drawing Sheets

FISHING ROD AND LINE GUIDE THEREOF

BACKGROUND OF THE INVENTION

1. Field of Invention

The present invention relates to a fishing rod and a line guide thereof. Specifically, this invention relates to an external pass-though type line guide, that includes a metal frame mounted on an outer circumference (outer surface) of a rod and a guide ring supported by the metal frame. This invention especially relates to a line guide that includes a mono-cock type frame in which front and rear mounting legs mount on the rod, a circular ring holding part holds the guide ring, and front and rear support legs, connected to the ring holding part and the front and rear mounting legs, are punched together as one body from a metal plate and bent to shape. This invention also relates to a fishing rod that includes a plurality of line guides having such a structure.

2. Description of Related Art

Conventional line guides that are used for external pass-through type fishing rods basically include a frame that has a ring holding part that holds a guide ring, a mounting part for mounting the ring holding part to a rod, and a connecting part that connects the ring holding part and the mounting part. The mounting of the line guides to the rod is a so-called binding type mounting. For this type of mounting, a frame for a line guide, used for a fishing rod that is targeted to catch medium or larger size fish, has mounting legs, provided at the front and rear sides of the frame, for mounting to the rod, in order to provide sufficient strength. Usually the frame has a structure in which the front and rear mounting legs and the ring holding part are connected by support legs. Normally two rear-side support legs are positioned at the left and right.

In general, this type of frame has a mono-cock structure in which each part is shaped unitarily from a metal plate. That is, the frame is ground after each part, such as the ring holding part, front and rear mounting legs and support legs described above, are punched together from a metal plate and bent as necessary.

Conventional line guides having such a mono-cock frame are described in Japanese Laid-Open Patent Application 48-85377 and Japanese Laid-Open Patent Application 63-137630.

SUMMARY OF THE INVENTION

However, for external pass-through fishing rods, a problem arises that the line is easily tangled with the line guides since the line guides protrude from the rod.

This problem can be solved by shaping the frame such that the line does not easily tangle with the line guides, and such that, even if the line does get tangled, the line is easily untangled. In addition, other strategies can be implemented to ensure that the structures that obviate the tangling problem do not sacrifice other functions or requirements, such as lightweightness of the fishing rod and low production cost. Especially, an increase in the weight causes an increase in shaking of the rod, and thus the line is more easily tangled.

The above problem can be overcome by providing a frame having a shape, in which by lengthening the rear support legs to reduce the inclination thereof, a line tangled by being wound around the frame slides on, and is easily released from, the rear support legs.

However, if the rear support legs are made longer, the overall length of the frame, when punched from a metal plate, increases. Therefore the material cost increases, and more weight is added, since the size increases.

The present invention addresses the conventional problems described above, and has an object of providing line guides for fishing rods which not only extremely reduce the inclination of the rear support legs just by lengthening rear support legs, but also suppress weight increase and material costs, so as to enable the manufacture of a fishing rod at low cost and which can easily solve the problem of line tangling without a perception of heaviness.

To achieve this object, a line guide for a fishing rod according to the present invention includes a frame, comprising front and rear mounting feet that are to be mounted to a rod, a circular ring holding part having a center axis extending in a direction substantially parallel to said fishing rod when the mounting feet are mounted to the rod, one front support leg extending from an apex of the ring holding part on a side of the ring holding part nearest the rod, connected to the front side mounting foot, and two rear support legs, each extending from any position of the ring holding part between the sides at the center of the ring holding part and an apex of the ring holding part on a side opposite the side nearest the rod, and connected to the rear mounting foot, and a guide ring fitted inside the ring holding part. Each part of the frame is punched together as one body from a metal plate and bent to shape. The length of the rear support leg is longer than the total length of the front support leg and the front mounting foot. The front support leg and the front mounting foot are punched out from inside of the rear support legs. The height of the front support leg is no longer than half of the outer diameter of the ring holding part.

In addition, a fishing rod according to the present invention has a plurality of line guides. Each line guide includes a frame, comprising front and rear mounting feet that are to be mounted to a rod, a circular ring holding part having a center axis extending in a direction substantially parallel to said fishing rod when the mounting feet are mounted to the rod, one front support leg extending from an apex of the ring holding part on a side of the ring holding part nearest the rod, connected to the front side mounting foot, and two rear support legs, each extending from any position of the ring holding part between the sides at the center of said ring holding part and an apex of the ring holding part on a side opposite the side nearest the rod, and connected to the rear mounting foot, and a guide ring fitted inside the ring holding part. Each part of the frame is punched together as one body from a metal plate and bent to shape. On all of the line guides, except for a line guide nearest the base of the fishing rod and a line guide nearest the tip of the fishing rod, the length of the rear support leg is longer than the total length of the front support leg and the front mounting foot, the front support leg and the front mounting foot are punched out from inside of the rear support legs, and the height of the front support leg is half or less of the outer diameter of the ring holding part.

Therefore, in accordance with the frame of the line guides of the present invention, since the height of the front support leg is kept low, the line is not easily tangled, and accuracy of casting increases due to the fact that twisting of the rod during casting does not easily occur. In addition, the inclination of the rear support legs is extremely reduced simply by lengthening the rear support legs by just a small amount, and therefore a line that is tangled on the frame can easily be untangled. Furthermore, since the increase in the weight, caused by increasing the size of the support legs, is substantially negated by the weight reduction, caused by reducing the height of the front support leg, the overall weight of the frame does not increase by a great amount.

Moreover, because the front support leg and the front mounting foot can be formed by using material from the inner area surrounded by the rear support legs that is usually discarded, the overall length of the frame does not become long when it is punched from a metal plate, even if the rear support legs are made to be long. Therefore, an increase in the material costs can be prevented, and processing of the rear mounting foot after punching can be achieved easily, since the front mounting foot is not punched out from the rear mounting foot.

In accordance with an implementation of the present invention, if the ring holding part of the frame is pressed to form a cylinder, with a narrow, circular belt-like area left along an edge of the inner circumference, the rear support legs extend from the rear edge of the ring holding part with almost no change in direction, so there is no protrusion protruding locally to the sides. Therefore, it is even harder for the line to get tangled on the frame, and the ring holding part is further strengthened.

DETAILED DESCRIPTION OF PREFERRED EMBODIMENTS

Figure 1:
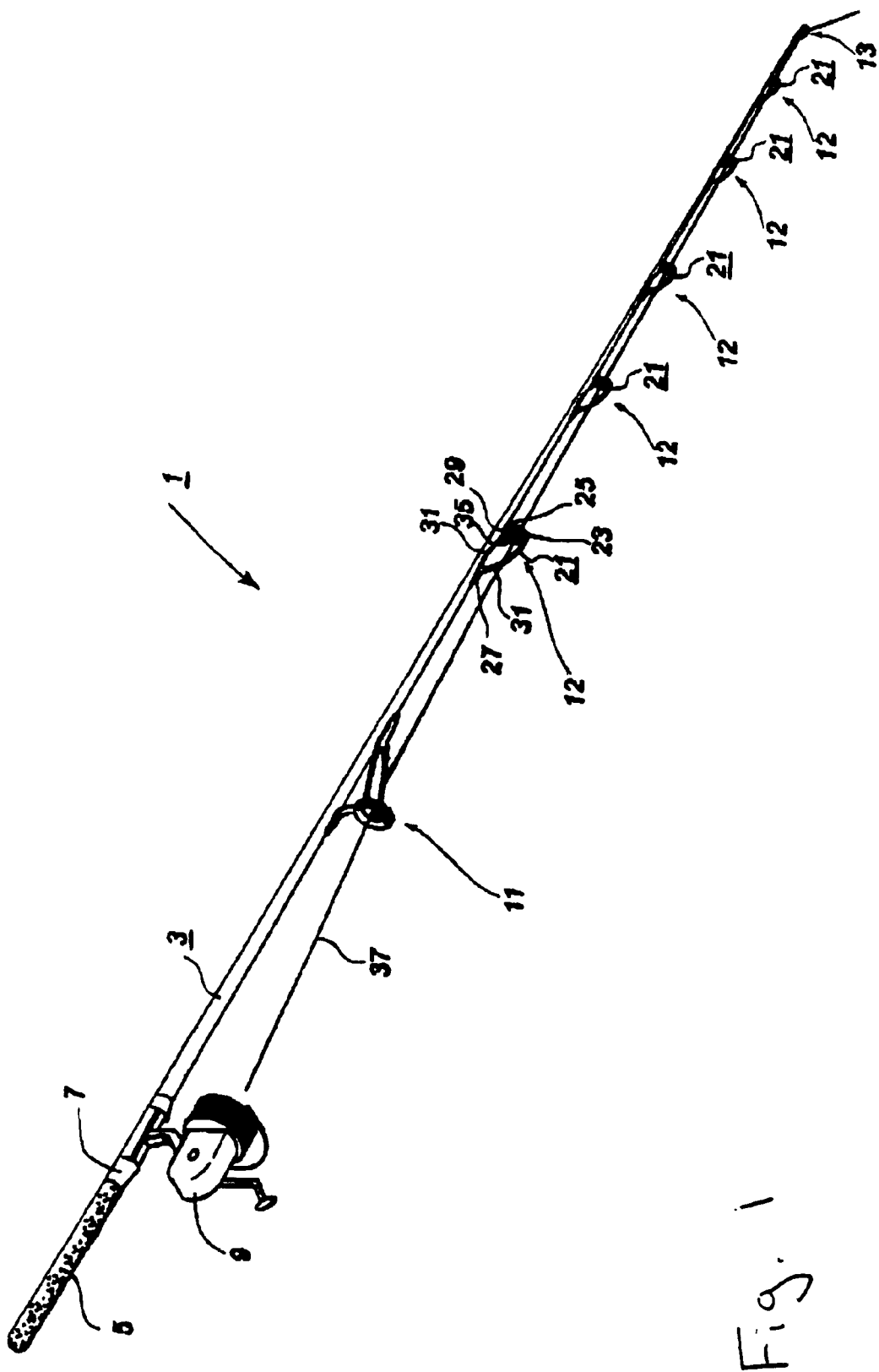
FIG. 1 is a perspective view of a fishing rod in accordance with an embodiment of the present invention.

A line guide and fishing rod in accordance with an embodiment of the present invention is described below via the figures.

A fishing rod 1 is shown in the figures. This fishing rod 1 is of a type known as a lure rod or the like, and has a one-piece-type rod body 3. On this rod body 3, a grip 5 is mounted at the butt end, and a reel seat 7 is mounted in front of the grip 5. On the bottom apex of the outer circumference of the rod body 3, between the reel seat 7 and the top of the rod, a plurality of line guides 11, 12 and 13 are mounted, positioned in line and with spaces in between.

A spinning reel 9 is mounted on the reel seat 7.

Among the line guides 11, 12 and 13, a butt guide 11 is located closest to the reel seat 7, and a top guide 13 is mounted at the top of the rod 3. The five line guides 12 are intermediate guides that are located between the butt guide 11 and the top guide 13.

The five intermediate guides 12 have the same structure and a similar shape. Each of these five guides 12 includes a metal frame 21 and a guide ring 35.

The frame 21 includes a circular ring holding part 23 which axially extends in a direction along the rod, a front mounting foot 25 and rear mounting foot 27, each having the shape of a tongue, a front support leg 29 extending from the top apex of the ring holding part 23 and connected to the front mounting foot 25, and two rear support legs 31 extending from the ring holding part 23 in a rearward and upward direction and connected to the rear mounting foot 27.

The ring holding part 23 is pressed into an overall cylindrical shape, with a narrow, circular belt like region left along an inner circumference edge 23a. This cylinder has a tapered shape with a rear part that is a little wider than the front part. Therefore, the ring holding part 23 has a rear edge 23b facing substantially straight back.

The rear support legs 31 extend from the sides of the rear edge 23b of the ring holding part 23, that is, from approximately the mid-points between the opposing sides of the center of the ring holding part 23 and the apex of the ring holding part 23 on the side opposite the rod side, in a rearward direction. The rear support legs 31 extend toward each other so as to form slightly curving arcs. The rear support legs 31 are connected to the front end of the rear mounting foot 27. The entire length of these rear support legs 31 is approximately 1.3 times the total length of the front mounting foot 25 and the front support leg 29.

Figure 2:
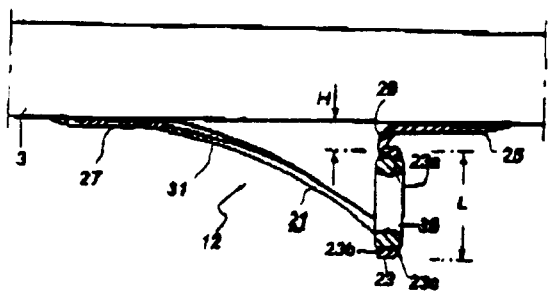
FIG. 2 is a perpendicularly sectioned diagram showing an expanded view of one of the intermediate guides for the fishing rod shown in FIG. 1.
Figure 3:
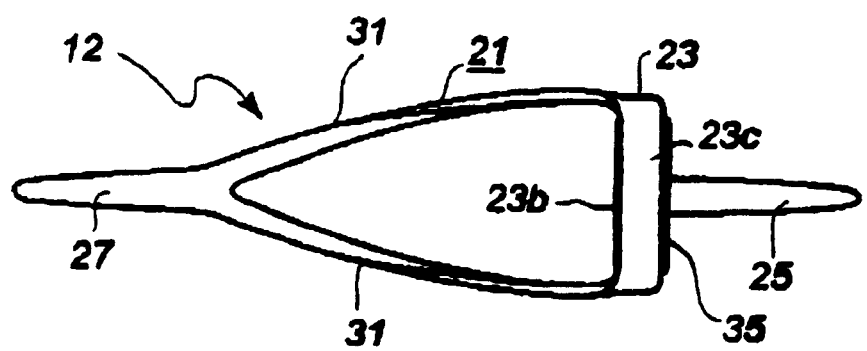
FIG. 3 is a bottom view of the intermediate guide shown in FIG. 2.
Figure 4:
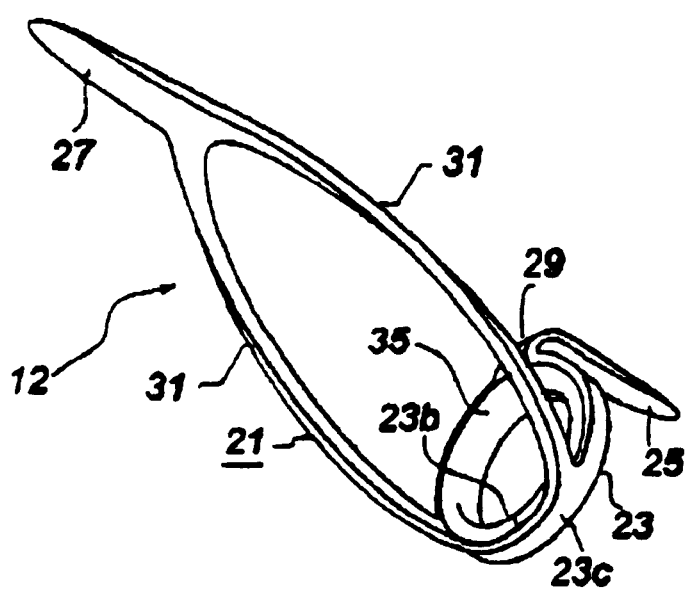
FIG. 4 is a perspective view of the intermediate guide shown in FIG. 2.
Figure 5:
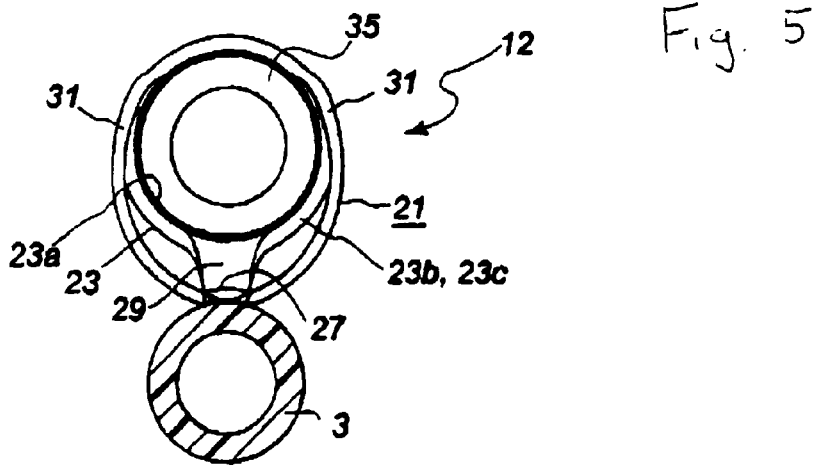
FIG. 5 is a rear view of the intermediate guide shown in FIG. 2.

As shown in FIG. 2, the front support leg 29 extends from the rear edge 23b of the ring holding part 23 as it is bent in an upward and forward direction, and is connected to the front mounting foot 25. The height H of the front support leg 29 (see FIG. 2) is about one-fourth (¼) of the outer diameter L of the ring holding part 23.

By making the height H of the front support leg 29 low and the length of the rear support leg 31 long as described above, the inclination of the rear support legs 31 becomes extremely small. The interior angle of this inclination (slope) is approximately 30 degrees with respect to a line connecting the front mounting foot 25 and the rear mounting foot 27.

This type of frame 21 can be made of a metal plate 33, such as stainless steel with a thickness of approximately 1 mm, and each part of the frame 21 can be formed together as one body by compound or pass-through-type press tooling.

Figure 6:
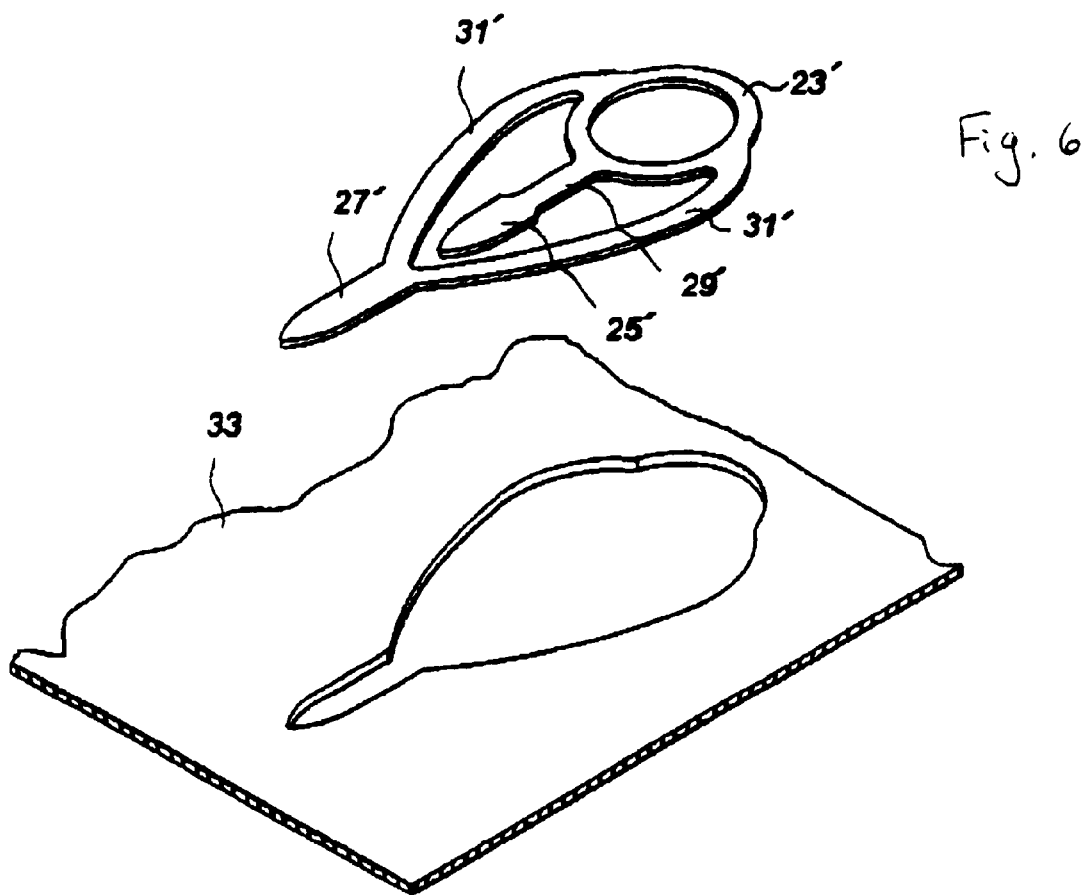
FIG. 6 is a perspective view showing a metal plate punched to make the intermediate guide shown in FIG. 2.

FIG. 6 shows an example of a punched shape. This punched shape has a ring holding part formation 23', a rear mounting foot formation 27' positioned at a certain distance from the ring holding part formation 23', rear support leg formations 31', forming a slightly curved V, which extend from the sides of the ring holding part formation 23' and are connected to the rear mounting foot formation 27', a front support leg formation 29' positioned in between the rear support leg formations 31' and extending from the ring holding part formation 23' towards the rear mounting foot formation 27', and a front mounting foot formation 25' connected to the front support leg formation 29'. The top of the front mounting foot formation 25' is adjacent to a position where the rear support leg formations 31' are closest to each other.

The rear support leg formations 31' are slightly longer than the total length of the rear support leg formation 29', the front mounting foot formation 25' and a radius of the ring holding part formation 23'.

The frame 21 is formed as the metal plate is punched into the shape described above, pressed to shape a cylinder to form the ring holding part formation 23', and bent to shape each part. The front support leg 29 and the front mounting foot 25 are cut from the area surrounded by the rear support legs 31 (the area conventionally thrown away). Therefore, no additional material is needed to form the front support leg 29 and the front mounting foot 25.

A guide ring 35 is formed in a circle, of hard material, such as ceramic. The guide ring 35 is inserted into the inner circumference 23a of the ring holding part 23 and glued. At this time, most of the guide ring 35 is accommodated within the inside of the wall 23c. Therefore, there is high adhesivity with respect to the frame 21, and thus the guide ring 35 is protected from external shocks.

For the five intermediate guides 12, the external form and inner diameter of the ring guide 35 are provided to be smaller the closer the intermediate guide 12 is positioned to the tip of the rod. However, there are no other differences in their respective structures.

The five intermediate guides 12 are fixed on the rod 3 with the mounting feet 25 and 27 mounted on the apex of the bottom of the rod body 3. The mounting feet 25 and 27 are mounted by being tied with a winding thread and glued on the rod body 3.

The butt guide 11 does not have any difference from the intermediate guides 12 in its structure. However, the butt guide 11 is one size larger than the intermediate guide 12 that is the closest to the butt guide 11. In addition, the butt guide 11 faces in the opposite direction from the intermediate guides, and a percentage of the height of the rear support legs, in regard to the outer diameter of the ring holding part, is larger. A method for mounting the butt guide 11 is similar to that for mounting the intermediate guides 12.

The fishing rod 1 is structured as described above. The operation of the fishing rod 1 is discussed below.

A line 37 is shown that is pulled from the spinning reel 9. This line 37 extends through each guide ring 35 from the butt guide 11 through the top guide 13. A terminal tackle (not shown in the figure) is connected to the end of the line 37.

When the terminal tackle is cast by swinging the fishing rod 1, the line 37 is pulled from the spinning reel 9 as it is spirally twisted. Most of this spiral twist is choked (collected) while the line 37 extends through the butt guide 11 and the intermediate guide 12 closest to the butt guide 11. Then, the line 37 becomes straight as it extends through the third intermediate guide 12 from the butt guide 11.

Then, if, for any reason, the line 37 is tangled on an intermediate guide 12, the line 37 slides on the rear support legs 31 of the frame 21, and is automatically released if a tension is applied to the tangled line 37 in a direction towards the rod tip by slightly swinging the rod or casting the terminal tackle.

The specific structure of the present invention is not limited to the embodiment described in detail above, and this invention includes design changes within a scope that does not deviate from the substance of the invention.

Especially, although the height of the front support leg of the intermediate guide is made to be approximately one-fourth (¼) of the outer diameter of the ring holding part in the above embodiment, this percentage can be selected from a range of half or less of the outer diameter of the ring holding part in accordance with the positions of the intermediate line guides mounted on the rod, or the type and size of the reel used. In other words, for the intermediate line guide near the butt guide, it is desired that the height of the front support leg shall not be limited, since the effect of choking the line is hindered if the height of the front support leg is set to be low. On the other hand, if the height of the front support leg is made to be more than half of the outer diameter of the ring holding part, it is necessary to make the rear support legs extremely long to reduce the inclination of the rear support legs.

For substantially the same reason, because the positions at which the rear support legs are connected to the ring holding part in the present invention is an important factor to affect the inclination of the rear support legs, these positions should be between the sides, exactly at the center of the ring holding part and the apex of ring holding part on the opposite side from the rod, in accordance with the positions of the line guide on the rod and/or the type of reel.

In the above embodiment, the present invention is applied to a one-piece lure fishing rod. However, the present invention is not limited to this type of fishing rod, and instead can be widely applied to fishing rods for cast fishing, surf fishing, boat fishing, mountain stream fishing and the like, and line guides used for fishing rods for those types of use.

For fishing rods and line guides for fishing rods related to the present invention, since the height of the front support leg is kept low, not only is the line not easily tangled, but also the accuracy of casting increases due to the fact that twists in the rod at the time of casting do not easily occur. In addition, the inclination of the rear support legs can be reduced simply by lengthening the rear support legs, and therefore, a line that becomes tangled on the frame can be easily released. Furthermore, the overall weight of the frame does not increase a lot, since the increase in weight caused by the increase in length of the rear support legs can be substantially negated by a reduction in weight due to the suppression of the height of the front support leg.

Moreover, because the front support leg and the front mounting foot can be formed using material from the area surrounded by the rear support legs, which was conventionally discarded, the overall length of the frame does not become long when punching from a metal plate, even if the rear support legs are made to be long. Therefore, not only can an increase in material costs be prevented, but also a process to form the rear mounting feet after punching can be accomplished simply, since cutting the front mounting foot from the rear mounting foot is not necessary.

In addition, based on the invention described, because the rear support legs extend from the rear edge of the ring holding part substantially without changing their directions, no parts on the rear support legs locally protrude to the sides. Therefore, it is even harder for the line to get tangled, and the strength of the ring holding part increases.

What is claimed is:

1. A line guide for a fishing rod that includes a rod, the line guide being manufactured at least in part from a metal plate, the line guide comprising:
   a frame that includes the following parts:
   front and rear mounting feet mountable to the rod,
   a circular ring holding part having a center axis that extends in a direction substantially parallel to said fishing rod when the mounting feet are mounted to the rod,
   a front support leg extending from an apex of the circular ring holding part on a side of the circular ring holding part nearest the rod, the front support leg being connected to said front mounting foot, a height of the front support leg extending between the front mounting foot and the apex of the circular ring holding part, and
   two rear support legs, each of the two rear support legs extending from any position of said circular ring holding part adjacent an apex of the circular ring holding part on a side opposite the side nearest the rod, the two rear support legs being connected to the rear mounting foot, a length of a rear support leg extending between the rear mounting foot and the circular ring holding part; and
   a guide ring disposed within said circular ring holding part; wherein
   each part of said frame is punched unitarily from the metal plate and bent to shape;

the length of each of said rear support legs is longer than a total length of said front support leg and said front mounting foot;

said front support leg and said front mounting foot are punched out from inside of said rear support legs;

the height of said front support leg is no longer than half as long as an outer diameter of said circular ring holding part:

an angle formed between the fishing rod and the rear support legs is approximately 30°; and a sum of the height of the front support leg and the outer diameter of the circular ring holding part is approximately one half a distance along the fishing rod between the front support leg and the rear mounting foot.

2. The line guide according to claim 1, wherein the circular ring holding part is pressed to form the shape of a cylinder, with an area left along its inner circumference edge.

3. The line guide according to claim 1, wherein each of the two rear support legs is spaced from the apex of the circular ring holding part on the side opposite the side nearest the rod.

4. The line guide according to claim 3, wherein each of the two rear support legs is spaced an equal amount from the apex of the circular ring holding part on the side opposite the side nearest the rod.

5. The line guide according to claim 4, wherein each of the two rear support legs is spaced in opposite directions from the apex of the circular ring holding part on the side opposite the side nearest the rod.

6. The line guide according to claim 5, wherein each of the two rear support legs are connected to a front end of the rear mounting foot.

7. The line guide according to claim 6, wherein each of the two rear support legs is bent so as to form an arc.

8. The line guide according to claim 7, wherein the front support leg extends from the circular ring holding part in an opposite direction from the two rear support legs.

9. The line guide according to claim 8, wherein the two rear support legs extend from the circular ring holding part so as to form a substantially oval shaped hollow space therebetween.

10. The line guide according to claim 9, wherein a rear end of the rear mounting foot has a smaller cross-section than a front end of the rear mounting foot, and a front end of the mounting foot has a smaller cross-section than a rear end of the front mounting foot.

11. A fishing rod with a plurality of line guides, the fishing rod including a rod having a base and a tip, each line guide being manufactured at least in part from a metal plate, each line guide comprising:

a frame that includes the following parts:
  front and rear mounting feet mountable to the rod,
  a circular ring holding part having a center axis that extends in a direction substantially parallel to said fishing rod when the mounting feet are mounted to the rod,
  a front support leg extending from an apex of the circular ring holding part on a side of the circular ring holding part nearest the rod, the front support leg being connected to said front mounting foot, a height of the front support leg extending between the front mounting foot and the apex of the circular ring holding part, and
  two rear support legs, each of the two rear support legs extending from any position of said circular ring holding part adjacent an apex of the circular ring holding part on a side opposite the side nearest the rod, the two rear support legs being connected to the rear mounting foot, a length of a rear support leg extending between the rear mounting foot and the circular ring holding part; and a guide ring disposed within said circular ring holding part; wherein
  each part of said frame is punched unitarily from the metal plate and bent to shape; and
  for all of the line guides, except for a line guide nearest the base of the rod and a line guide nearest the tip of the rod:
    the length of each of said rear support legs is longer than a total length of said front support leg and said front mounting foot;
    said front support leg and said front mounting foot are punched out from inside of said rear support legs;
    the height of said front support leg is no longer than half as long as an outer diameter of said circular ring holding part;
    an angle formed between the fishing rod and the rear support legs is approximately 30°; and
    a sum of the height of the front support leg and the outer diameter of the circular ring holding part is approximately one half a distance along the fishing rod between the front support leg and the rear mounting foot.

12. The fishing rod according to claim 11, wherein each of the two rear support legs is spaced from the apex of the circular ring holding part on the side opposite the side nearest the rod.

13. The fishing rod according to claim 12, wherein each of the two rear support legs is spaced an equal amount from the apex of the circular ring holding part on the side opposite the side nearest the rod.

14. The fishing rod according to claim 13, wherein each of the two rear support legs is spaced in opposite directions from the apex of the circular ring holding part on the side opposite the side nearest the rod.

15. The fishing rod according to claim 14, wherein each of the two rear support legs are connected to a front end of the rear mounting foot.

16. The fishing rod according to claim 15, wherein each of the two rear support legs is bent so as to form an arc.

17. The fishing rod according to claim 16, wherein the front support leg extends from the circular ring holding part in an opposite direction from the two rear support legs.

18. The fishing rod according to claim 17, wherein the two rear support legs extend from the circular ring holding part so as to form a substantially oval shaped hollow space therebetween.

19. The fishing rod according to claim 18, wherein a rear end of the rear mounting foot has a smaller cross-section than a front end of the rear mounting foot, and a front end of the front mounting foot has a smaller cross-section than a rear end of the front mounting foot.

* * * * *